United States Patent
Swann et al.

[11] Patent Number: 6,158,769
[45] Date of Patent: Dec. 12, 2000

[54] INFLATOR SLOPE CONTROL DEVICE

[75] Inventors: Timothy A. Swann, Mesa; Jess A. Cuevas, Scottsdale; Ahmad K. Al-Amin, Higley; Bryan W. Shirk; Roy D. Van Wynsberghe, both of Mesa, all of Ariz.

[73] Assignee: TRW Inc., Lyndhurst, Ohio

[21] Appl. No.: 09/087,247

[22] Filed: May 29, 1998

[51] Int. Cl.[7] .................................................. B60R 21/26
[52] U.S. Cl. ........................... 280/736; 280/742; 138/45; 251/121
[58] Field of Search .................................. 280/736, 737, 280/740, 742; 138/45; 251/121

[56] References Cited

U.S. PATENT DOCUMENTS

| | | | |
|---|---|---|---|
| 4,429,552 | 2/1984 | Reedy ........................................ | 62/528 |
| 4,973,024 | 11/1990 | Homma ..................................... | 251/11 |
| 5,016,913 | 5/1991 | Nakajima et al. ....................... | 280/738 |
| 5,366,242 | 11/1994 | Faigle et al. ............................ | 280/736 |
| 5,388,860 | 2/1995 | Brede et al. ............................ | 280/739 |
| 5,709,405 | 1/1998 | Saderholm et al. .................... | 280/736 |
| 5,803,494 | 9/1998 | Headley .................................. | 280/741 |
| 5,906,394 | 5/1999 | Wan Wynsberghe et al. ........ | 280/737 |
| 5,927,753 | 7/1999 | Faigle et al. ............................ | 280/735 |

*Primary Examiner*—J. J. Swann
*Assistant Examiner*—David R. Dunn
*Attorney, Agent, or Firm*—Tarolli, Sundheim, Covell, Tummino & Szabo L.L.P.

[57] ABSTRACT

An apparatus for helping to protect a vehicle occupant in the event of a collision comprises an inflatable vehicle occupant protection device 12. An inflator 14 having a source of inflation fluid 48 for inflating the protection device 12 includes a passage 30 through which the inflation fluid 48 flows from the inflator 14 into the protection device 12. A member 60 for regulating the flow of the inflation fluid 48 through the passage 30 defines a first orifice 68, through which inflation fluid 48 flows, of a first fluid flow area when no electric current is applied to the member 60 and defines a second orifice 68a, through which inflation fluid 48 flows, of second fluid flow area larger than the first fluid flow area when electric current is applied to the member 60.

12 Claims, 3 Drawing Sheets

INFLATOR SLOPE CONTROL DEVICE

TECHNICAL FIELD

The present invention relates to an apparatus for helping to protect a vehicle occupant in the event of a collision, and particularly relates to an inflator for providing inflation fluid to inflate an inflatable vehicle occupant protection device, such as an air bag.

BACKGROUND OF THE INVENTION

An inflatable vehicle occupant protection device, such as an air bag, is inflated when a vehicle experiences a crash. Inflation fluid is directed to flow from an inflator into the air bag to inflate the air bag. When the air bag is inflated, it extends into the vehicle occupant compartment to help protect an occupant of the vehicle from forceful impact with parts of the vehicle.

Some inflators are known as dual stage inflators. A dual stage inflator typically provides for two different inflation fluid flow rates into the air bag. The initial inflation fluid flow rate into the air bag is a relatively low rate and thereafter the fluid flow rate increases.

SUMMARY OF THE INVENTION

An apparatus in accordance with the present invention comprises an inflatable vehicle occupant protection device and an inflator providing a source of inflation fluid for inflating the protection device. The inflator includes a passage through which the inflation fluid flows from the inflator into the protection device. The apparatus further comprises a member for regulating the flow of the inflation fluid through the passage. The member defines a first orifice, through which the inflation fluid flows, of a first fluid flow area when no electric current is applied to the member and defines a second orifice, through which the inflation fluid flows, of a second fluid flow area larger than the first area when electric current is applied to the member. As a result, inflation fluid flow into the inflatable vehicle occupant protection device is at a relatively low rate when the inflation fluid flows through the first flow area and is at a relatively higher rate when the inflation fluid flows through the second flow area.

BRIEF DESCRIPTION OF THE DRAWINGS

The foregoing and other features of the invention will become more apparent to one skilled in the art upon consideration of the following description of the invention and the accompanying drawings in which.

DESCRIPTION OF PREFERRED EMBODIMENTS

Figure 1:
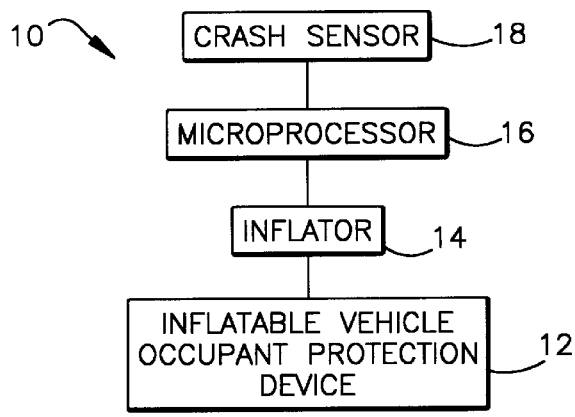
FIG. 1 is a schematic view of a vehicle occupant protection system embodying the present invention and including an inflator.

Referring to FIG. 1, a vehicle occupant protection system 10 includes an inflatable vehicle occupant protection device 12. In the preferred embodiment of the present invention, the inflatable vehicle occupant protection device 12 is an air bag. The inflatable vehicle occupant protection device could be, for example, an inflatable seat belt, an inflatable knee bolster, an inflatable head liner or side curtain, or a knee bolster operated by an air bag.

An inflator 14 is associated with the inflatable vehicle occupant protection device 12. The inflator 14 is actuatable to direct inflation fluid to the inflatable vehicle occupant protection device 12 to inflate the inflatable vehicle occupant protection device 12.

A microprocessor 16 is connected to the inflator 14. The microprocessor 16 includes a delay means 15, schematically shown in FIG. 2. The delay means 15 sends a first signal to the inflator 14 to actuate the inflator 14. The delay means 15 then sends a second signal to the inflator 14 which alters the rate of inflation of the inflatable vehicle occupant protection device 12 as will be described below.

The system 10 also includes a crash sensor 18. The crash sensor 18 is a known device that senses a vehicle condition, such as vehicle deceleration, indicative of a collision. The crash sensor 18 measures the magnitude and the duration of the deceleration. If the magnitude and duration of the deceleration meet predetermined threshold levels, the crash sensor either transmits a signal or causes a signal to be transmitted to the delay means 15 to actuate the inflator 14. The inflatable vehicle occupant protection device 12 is then inflated and extends into the occupant compartment of the vehicle to help protect a vehicle occupant from a forceful impact with parts of the vehicle.

Figure 2:
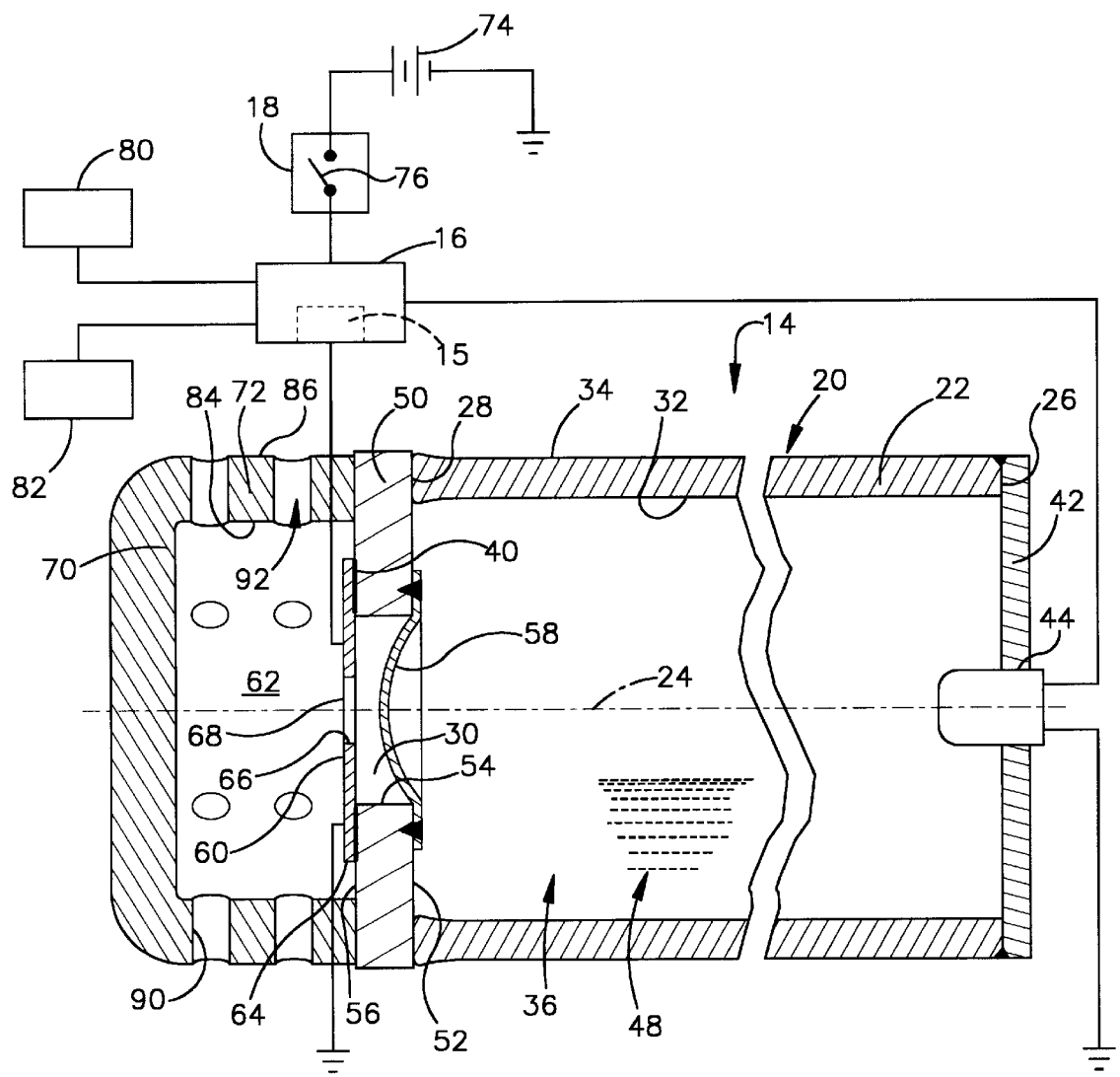
FIG. 2 is a schematic view of parts of the vehicle occupant protection system of FIG. 1 and illustrating the inflator in section.

In the first embodiment depicted in FIG. 2, the inflator 14 includes a container 20, made of suitable material, such as steel or aluminum. The container 20 includes a generally cylindrical side wall 22 extending along a central longitudinal axis 24 between a first open end 26 and a second open end 28. The side wall 22 includes a cylindrical inner surface 32 and a cylindrical outer surface 34.

The container 20 further includes an end wall 42 secured to the first open end 26 by any suitable means such as a weld. The end wall 42 supports an actuatable pyrotechnic igniter 44. The igniter 44 includes an ignitable material.

The container 20 also includes an end cap 50 secured to the second open end 28 of the side wall 22 by any suitable means such as a weld. The end cap 50 includes a radially extending first surface 52 and an axially centered cylindrical surface 54. The cylindrical surface 54 of the end cap 50 has a diameter smaller than the diameter of the inner surface 32 of the side wall 22 and extends axially between and connects the first surface 52 of the end cap 50 and a radially extending second surface 56 of the end cap 50. The cylindrical surface 54 defines an opening 30 through the end cap 50.

A burst disk 58 is secured to the first surface 52 of the end cap 50 by any suitable means such as a weld. The burst disk 58 closes the opening 30. Together, the burst disk 58 and the end cap 50 close the second open end 28 of the side wall 22 to define a closed chamber 36 in the container 20. The chamber 36 is defined by the end cap 50, the burst disc 58, the cylindrical side wall 22, and the end wall 42.

A supply of gas 48 for inflating the inflatable vehicle occupant protection device 12 is stored in the chamber 36. Preferably, the stored gas 48 includes at least a small amount of a tracer gas, such as helium, for helping to detect gas leaks.

The stored gas 48 within the container 20 is under pressure. The pressure depends upon such factors as the volume of the inflatable vehicle occupant protection device 12 to be inflated, the time available for inflation, the inflation pressure desired, and the volume of the chamber 36 storing the gas 48. The stored gas 48 in the chamber 36 is typically at a pressure of about 2,000 to about 8,000 pounds per square inch (psi). Preferably, the stored gas 48 in the chamber 36 is at a pressure of about 3,500 psi to about 6,500 psi.

A diffuser 70 is welded to the second surface 56 of the end cap 50. The diffuser 70 includes a cylindrical side wall 72 coaxial with the side wall 22 of the container 20 and centered on the axis 24. The side wall 72 includes a cylindrical inner surface 84 and a cylindrical outer surface 86. The diffuser 70 has a central chamber 62. The chamber 62 is in fluid communication with the opening 30 in the end cap 50.

A radially extending member 60 is secured to the second surface 56 of the end cap 50 by any suitable means which will not conduct electricity, such as a glass to metal seal 40. The member 60 defines an orifice 68 between the chamber 62 and the opening 30. The member 60 has an outer circular surface 64 with a diameter larger than the diameter of the cylindrical surface 54 of the end cap 50. The member 60 also has an inner circular surface 66 with a diameter smaller than the diameter of the cylindrical surface 54 of the end cap 50. The inner circular surface 66 defines the orifice 68 which is centered on the axis 24. The orifice 68 has a fluid flow area, which is smaller than the fluid flow area of the opening 30. The orifice 68 also has a smaller fluid flow area than the fluid flow area of the diffuser chamber 62.

A plurality of cylindrical surfaces 90 extend radially between the inner surface 84 and the outer surface 86 of the cylindrical side wall 72 of the diffuser 70 to define a plurality of diffuser outlet passages 92. The diffuser outlet passages 92 connect the chamber 62 in fluid communication with the inflatable vehicle occupant protection device 12. The total fluid flow area of the passages 92 is greater than the fluid flow area of the orifice 68. Thus, the orifice 68 has the smallest fluid flow area in the flow path for the inflation fluid from the chamber 36 to the vehicle occupant protection device 12.

Figure 4:
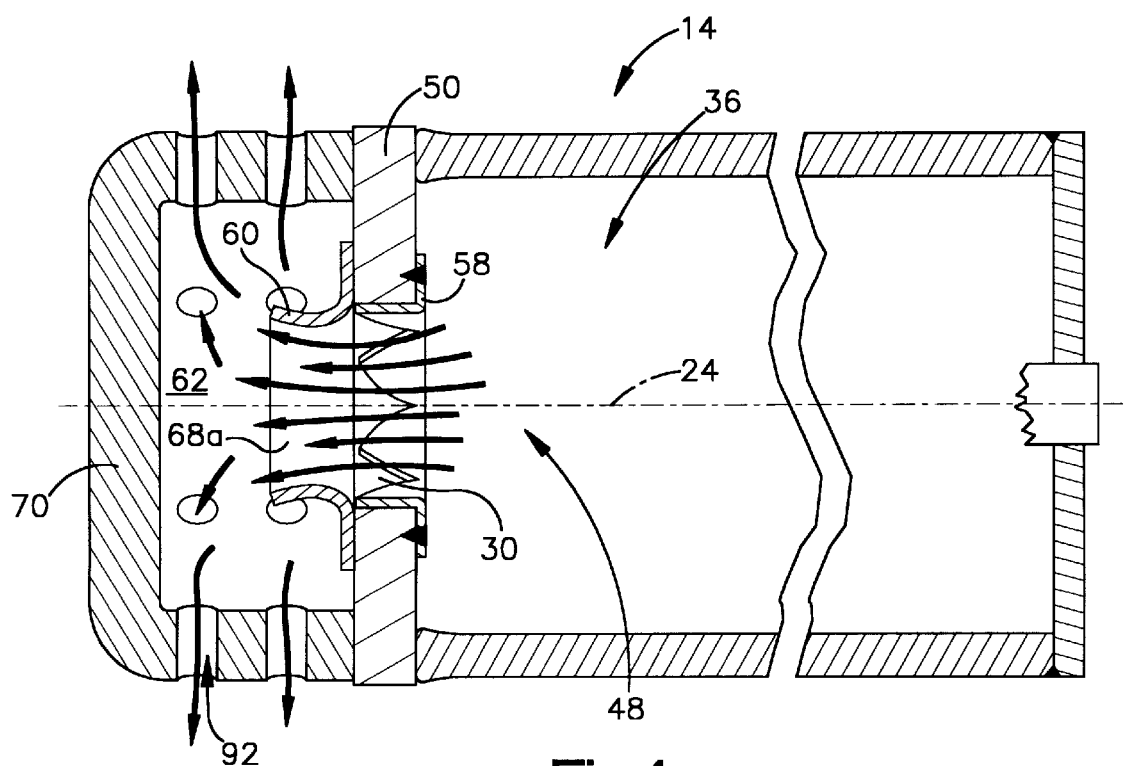
FIG. 4 is another schematic sectional view of the inflator in FIG. 2 during another phase of operation.

In accordance with the present invention, the member 60 is made from a material having an initial shape below a transition temperature and a different shape above the transition temperature. In the preferred embodiment the material is Nitinol, a shape memory alloy. Nitinol is a stoichiometric mixture of nickel and titanium, or about 55%, by weight, nickel and about 45%, by weight, titanium. Nitinol can be heated above ambient temperature and above a transition temperature. When the temperature of Nitinol is above the transition temperature, it can be set into a first shape. When the temperature of Nitinol is still above ambient temperature but cooled below the transition temperature, it can be set into a second shape. The Nitinol when in the second shape can be cooled to ambient temperature. Upon heating the Nitinol again above the transition temperature, Nitinol returns to its first shape. The member 60 when heated above the transition temperature is shaped as shown in FIG. 4 and when cooled below the transition temperature is shaped as shown in FIG. 2.

The member 60 is connected in an electrical circuit, schematically shown in FIG. 2, with a power source 74, a normally open switch 76, the microprocessor 16, and the igniter 44. The power source 74 is preferably a vehicle battery or a capacitor. The power source 74, the member 60, and the igniter 44 are all attached to a vehicle electrical ground as shown schematically in FIG. 2.

Upon the occurrence of sudden vehicle deceleration indicative of a collision for which inflation of the inflatable vehicle occupant protection device 12 is desired, the normally open switch 76 closes. An electric current is transmitted from the power source 74 to the delay means 15. The delay means 15 transmits an electric current to the igniter 44 to ignite the ignitable material of the igniter 44.

Figure 3:
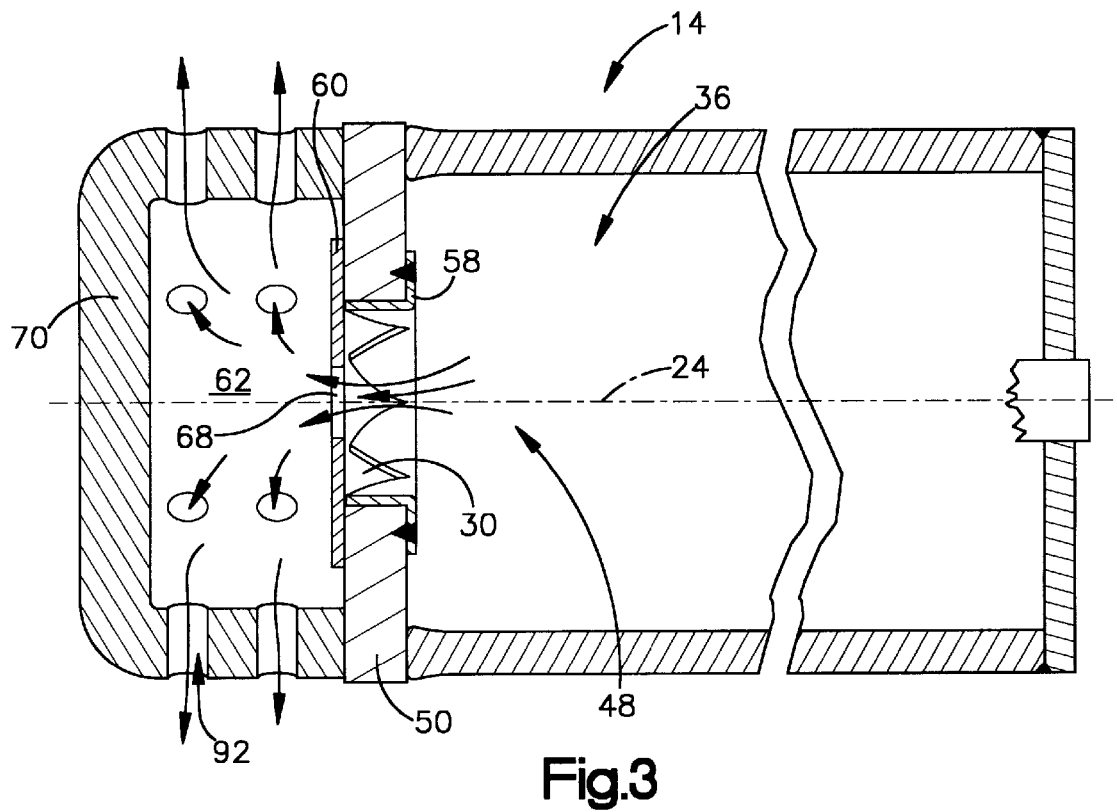
FIG. 3 is a schematic sectional view of the inflator of FIG. 2 during one phase of operation.

Burning of the ignitable material results in combustion products which include heat and gas or vapor. The combustion products mix with the stored gas 48 to increase the pressure of the stored gas 48. As depicted in FIG. 3, the increased pressure ruptures the burst disc 58 and opens the chamber 36. The ruptured burst disc 58 allows the gases to flow through the opening 30, the orifice 68, the diffuser chamber 62, and the radially extending gas flow passages 92 into the inflatable vehicle occupant protection device 12. Because it has the smallest flow area, the orifice 68 controls the inflation fluid flow and permits inflation fluid flow at a first rate.

The delay means 15 then transmits an electric current to the member 60 about 5 to about 30 milliseconds after the delay means 15 sends the electric current to the igniter 44. The length in time of the delay is calculated by the microprocessor 16 based on information provided by a vehicle sensor 80 and/or an occupant sensor 82 shown schematically in FIG. 2. The vehicle sensor 80 may measure vehicle characteristics, such as vehicle velocity and/or vehicle weight. The occupant sensor 82 may measure occupant characteristics such as occupant location, occupant presence in a vehicle seat, and/or occupant weight.

As depicted in FIG. 4, the electric current is transmitted to the member 60. The electric current is of sufficient magnitude to heat the member 60 to a temperature above its transition temperature. This results in the member 60 changing in shape and defining an orifice 68a with a second fluid flow area greater than a first fluid flow area of orifice 68. Because it is larger than the first flow area, the second fluid flow area allows the inflation fluid to flow at a second, increased rate from the chamber 36, through the opening 30, the orifice 68a, the diffuser chamber 62, and the diffuser passages 92, and into the inflatable vehicle occupant protection device 12. The inflatable vehicle occupant protection device 12 is thus inflated to a predetermined position to help protect a vehicle occupant from forcibly striking parts of the vehicle. The fluid flow area of the orifice 68a in FIG. 4 is still smaller than the fluid flow area of the opening 30 and the total flow area of the diffuser passages 92. Thus, the orifice 68a still controls flow into the vehicle occupant protection device 12.

Figure 5:
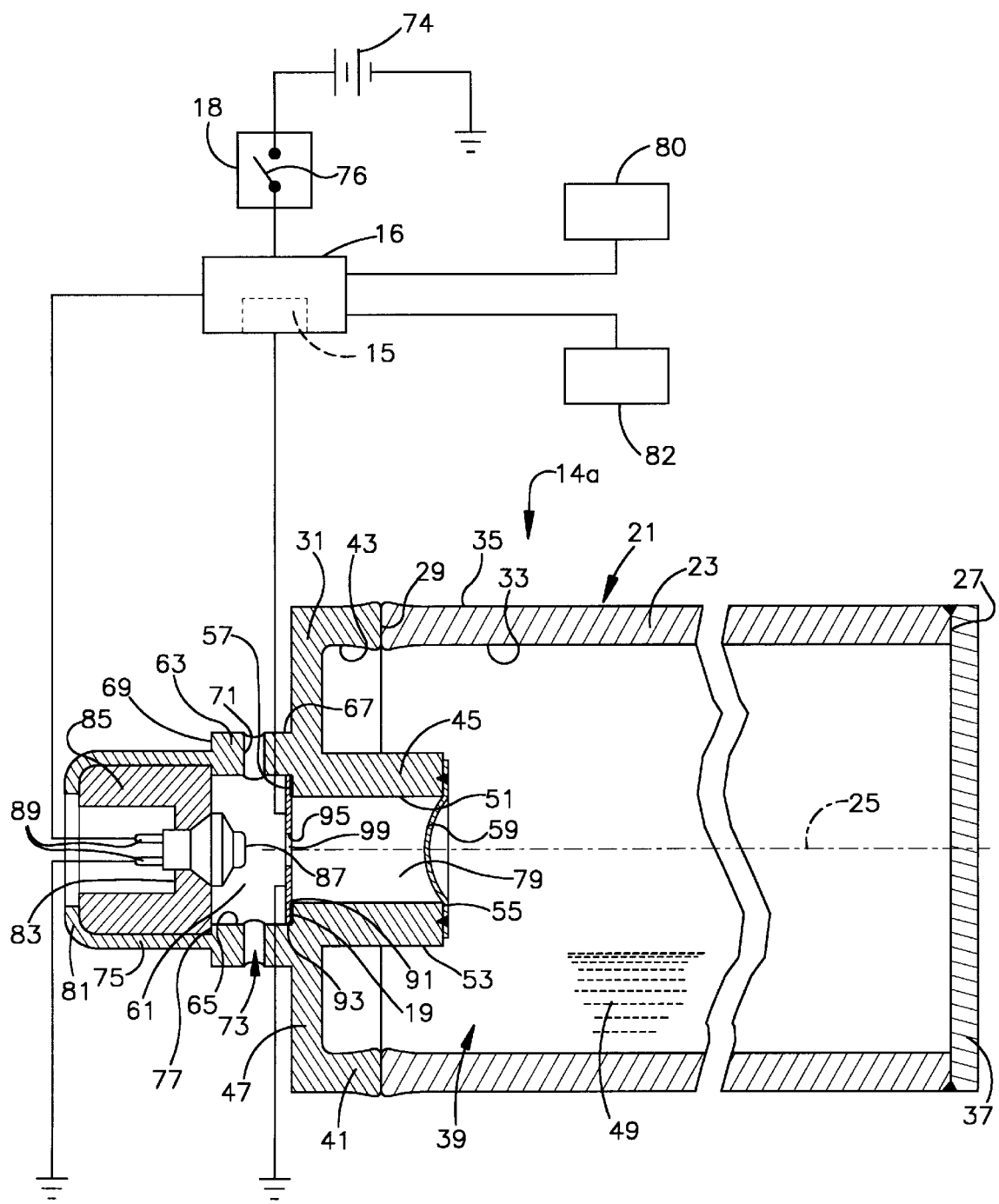
FIG. 5 is a view similar to FIG. 2 illustrating a second embodiment of the present invention.

FIG. 5 illustrates an inflator 14a constructed in accordance with a second embodiment of the present invention. The inflator 14a can be used with the vehicle occupant protection system 10 of the first embodiment. The inflator 14a includes a container 21 made of a suitable material, such as steel or aluminum. The container 21 includes a generally cylindrical side wall 23 extending along a longitudinal central axis 25 between a first open end 27 and a second open end 29 of the tubular container portion. The side wall 23 includes a cylindrical inner surface 33 and a cylindrical outer surface 35.

The container 21 further includes an end wall 37 secured to the first open end 27 of the side wall 23 by any suitable means, such as a weld. The container 21 also includes an end cap 31 secured to the second open end 29 of the side wall 23 by any suitable means, such as a weld.

The end cap 31 includes a first cylindrical wall 41, a second cylindrical wall 45, and a third cylindrical wall 63.

The first, second, and third cylindrical walls 41, 45, and 63 are coaxial with the side wall 23 of the container 21.

The first cylindrical wall 41 of the end cap 31 projects axially toward the end wall 37 and has a cylindrical inner surface 43. The diameter of the cylindrical inner surface 43 of the first cylindrical wall 41 is the same as the diameter of the inner surface 33 of the side wall 23. An end wall 47 extends radially between and connects the first and second cylindrical walls 41 and 45 of the end cap 31.

The second cylindrical wall 45 of the end cap 31 projects axially toward the end wall 37 and has a cylindrical inner surface 51 and a cylindrical outer surface 53, parallel to the inner surface 51. The inner surface 51 of the second wall 45 has a diameter which is smaller than the diameter of the inner surface 33 of the side wall 23. The inner surface 51 of the second wall 45 extends between and connects a first radially extending surface 55 and a second radially extending surface 57 of the second wall 45. The cylindrical surface 51 defines an opening 79 through the end cap 31.

The first radially extending surface 55 is the portion of the second wall 45 which is closest to the end wall 37. A burst disk 59 is secured to the first radially extending surface 55 of the second wall 45 by any suitable means such as a weld. The side wall 23, the end cap 31, the burst disk 59, and the end wall 37 cooperate to define a closed chamber 39 in the container 21.

A supply of gas 49 for inflating the inflatable vehicle occupant protection device 12 is stored in the chamber 39. Preferably, the stored gas includes at least a small amount of a tracer gas, such as helium, for helping to detect a gas leak.

The stored gas 49 within the container 21 is under pressure. The pressure depends upon such factors as the volume of the inflatable vehicle occupant protection device 12 to be inflated, the time available for inflation, the inflation pressure desired and the volume of the chamber 39 storing the gas 49. The stored gas 49 in the chamber 39 is typically at a pressure of about 2,000 to about 8,000 pounds per square inch (psi). Preferably, the stored gas 49 in the chamber 39 is at a pressure of about 3,500 psi to about 6,500 psi.

The third cylindrical wall 63 of the end cap 31 extends axially from the radially extending side wall 47 of the end cap 31 in a direction away from the end wall 37. The third cylindrical wall 63 of the end cap 31 has a cylindrical inner surface 65 and a cylindrical outer surface 67. The cylindrical inner surface 65 of the third wall 63 extends between and connects the second radially extending surface 57 of the second wall 45 and a radially extending surface 69 of the third wall 63. The inner surface 65 of the third wall 63 defines a central chamber 61. The chamber 61 is in fluid communication with the opening 79 of the end cap 31.

A radially extending member 91 is secured to the second surface 57 of the second cylindrical side wall 45 by any suitable means which will not conduct electricity, such as a glass to metal seal 19. The member 91 defines an orifice 99 between the chamber 61 and the opening 79. The member 91 has an outer circular surface 93 with a diameter larger than the diameter of the inner surface 51 of the second wall 45. The member 91 also has an inner circular surface 95 with a diameter smaller than the diameter of the inner surface 51 of the second wall 45. The inner circular surface 95 defines the orifice 99 which is centered on the axis 25. The orifice 99 has a fluid flow area which is smaller than the fluid flow area of the opening 79. The orifice 99 also has a smaller fluid flow area than the fluid flow area of the chamber 61 of the end cap 31.

A plurality of cylindrical surfaces 71 extend radially between the inner surface 65 of the third cylindrical wall 63 and the outer surface 67 of the third cylindrical wall 63 of the end cap 31 to define a plurality of outlet passages 73. The outlet passages 73 connect the chamber 61 in fluid communication with the inflatable vehicle occupant protection device 12. The total fluid flow area of the passages 73 is greater that the fluid flow area of the orifice 99. Thus, the orifice 99 has the smallest fluid flow area in the flow path for the inflation fluid from the chamber 39 to the inflatable vehicle occupant protection device 12.

A cylindrical mounting wall 75 extends axially away from the radially extending surface 69 of the third wall 63 of the end cap 31. The mounting wall 75 is spaced radially outward of the inner surface 65 of the third cylindrical wall 63 to define a mounting surface portion 77 on the radially extending surface 69 of the third wall 63. The mounting wall 75 includes a crimped flange portion 81, which extends axially when it is in its uncrimped position (not shown) and which extends radially inward when it is in its crimped position.

A laser diode assembly 83 is disposed radially inward of the mounting wall 75 of the end cap 31. The laser diode assembly 83 includes a housing 85 disposed axially between the mounting surface portion 77 of the radially extending surface 69 and the crimped flange portion 81 of the mounting wall 75.

A laser diode 87 is disposed in the housing 85, centered on the axis 25 and facing the burst disk 59. A pair of electrodes 89 extend from the laser diode 87 and connect the laser diode 87 in an electrical circuit, schematically shown in FIG. 5

In accordance with the present invention the member 91 is made from a material having an initial shape below a transition temperature and a different shape above the transition temperature. In the preferred embodiment the material is Nitinol, a shape memory alloy. Nitinol is a stoichiometric mixture of nickel and titanium, or about 55%, by weight, nickel and about 45%, by weight, titanium. Nitinol can be heated above ambient temperature and above a transition temperature. When the temperature of Nitinol is above the transition temperature, it can be molded into a first shape. When the transition temperature of Nitinol is still above ambient temperature but cooled below the transition temperature, it can be molded into a second shape. The Nitinol when in the second shape can be cooled to ambient temperature. Upon heating the Nitinol again above the transition temperature, Nitinol returns to its first shape.

The member 91 is connected in an electrical circuit, schematically shown in FIG. 5, with a power source 74, a normally open switch 76, the microprocessor 16, and the laser diode 87. The power source 74 is preferably a vehicle battery or a capacitor. The switch 76 is part of the crash sensor 18. The power source 74, the member 91, and the laser diode 87 are all attached to a vehicle electrical ground as shown schematically in FIG. 5.

Upon the occurrence of sudden vehicle deceleration indicative of a collision for which inflation of the inflatable vehicle occupant protection device 12 is desired, the normally open switch 76 closes. An electric current is transmitted from the power source 74 to the delay means 15. The delay means 15 transmits an electric current to the laser diode 87. The electric current actuates the laser diode 87, causing the laser diode 87 to emit laser light which is projected axially through the chamber 61 and the opening 79 of the end cap 31 to the burst disk 59. The laser light impinges on and heats the burst disk 59 to weaken the burst disk 59 so that it opens. The inflation gases 48 flow through the opening 79, the orifice 99, the chamber 61, and the radially extending gas flow passages 73 into the inflatable vehicle occupant protection device 12. The orifice 99 controls the inflation fluid flow and permits inflation fluid flow at a first rate.

The delay means 15 then transmits an electric current to the member 91 about 5 to about 30 milliseconds after the delay means 15 sends the electric current to the laser diode 87. The length in time of the delay is calculated by the microprocessor 16 based on information provided by a vehicle sensor 80 and/or an occupant sensor 82 shown schematically in FIG. 5. The vehicle sensor 80 may measure vehicle characteristics, such as vehicle velocity and/or vehicle weight. The occupant sensor 82 may measure occupant characteristics such as occupant location, occupant presence in the seat, and/or occupant weight.

The electric current is transmitted to the member 91. The electric current is of sufficient magnitude to heat the member 91 to a temperature above its transition temperature. This results in the member 91 changing in shape and defining an orifice 99a (not shown) with a second fluid flow area greater than a first fluid flow area of orifice 99. Because it is greater than the first fluid flow area, the second fluid flow area allows the inflation fluid to flow at a second increased rate from the chamber 39, through the opening 79, the orifice 99a, the chamber 61, and the outlet passages 73, and into the inflatable vehicle occupant protection device 12. The inflatable vehicle occupant protection device 12 is thus inflated to a predetermined position to help protect a vehicle occupant from forcibly striking parts of the vehicle. The fluid flow area of the orifice 99a is still smaller than the fluid flow area of the opening 79, chamber 61, and the total fluid flow area of the outlet passages 73. Thus, the orifice 99a still controls flow into the vehicle occupant protection device.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to protect a vehicle occupant in the event of a collision, said apparatus comprising:

an inflatable vehicle occupant protection device;

an inflator having a source of inflation fluid for inflating said protection device, said inflator including a passage through which the inflation fluid flows from said inflator into said protection device; and a shape memory alloy member for regulating the flow of inflation fluid through said passage, said shape memory alloy member having an opening extending through said shape memory alloy member, said opening defining a first sized orifice, through which inflation fluid flows, of a first fluid flow area when no electric current is applied to said shape memory alloy member, said opening defining a second sized orifice, through which the inflation fluid flows, of a second fluid flow area larger than the first fluid flow area when electric current is applied to said shape memory alloy member.

2. An apparatus as defined in claim 1 wherein said inflator has an inflation fluid storage chamber, said inflation fluid being stored under pressure in said storage chamber; and said inflation fluid flows at a first rate through said first sized orifice and at a second increased rate through said second sized orifice.

3. An apparatus as defined in claim 1 wherein said shape memory alloy member which changes shape and defines said second sized orifice of said second area when an electric current is applied to said shape memory alloy member.

4. An apparatus as defined in claim 1 wherein said inflator has a chamber and actuatable means for opening said chamber to provide for inflation fluid flow from said chamber toward said member.

5. An apparatus as defined in claim 4 wherein said actuatable means comprises a rupture disk which blocks fluid flow from said chamber until said rupture disk is ruptured.

6. An apparatus as defined in claim 4 further including sensor means for sensing a vehicle characteristic and providing a signal for actuating said actuatable means; and a delay means for delaying application of said electric current to said shape memory alloy member for a time period of about 5 to about 30 milliseconds after said sensor means provides said signal to said actuatable means.

7. An apparatus as defined in claim 1 wherein said shape memory alloy member has surface means defining said opening through said shape memory alloy member.

8. An apparatus for helping to protect a vehicle occupant in the event of a collision, the apparatus comprising:

an inflatable vehicle occupant protection device;

an inflator having a source of inflation fluid for inflating said protection device, said inflator including a passage through which the inflation fluid flows from said inflator into said protection device; and a member, said member being homogenous, for regulating the flow of inflation fluid through said passage, said member being made of a shape memory alloy having first and second shapes, said member having a surface defining a first sized orifice of a first fluid flow area through which inflation fluid flows when said member is in said first shape, said surface defining a second sized orifice of a second fluid flow area through which the inflation fluid flows which is larger than said first fluid flow area when said member is in said second shape.

9. An apparatus as defined in claim 8 wherein said member changes from said first shape to said second shape when an electric current is applied to said member.

10. An apparatus as defined in claim 9 wherein said inflator has a chamber and actuatable means for opening said chamber to provide for inflation fluid flow from said chamber toward said member.

11. An apparatus as defined in claim 10 wherein said actuatable means comprises a rupture disk which blocks fluid flow from said chamber until said rupture disk is ruptured.

12. An apparatus as defined in claim 10 further including sensor means for sensing a vehicle characteristic and providing a signal for actuating said actuatable means; and a delay means for delaying application of said electric current to said member for a time period of about 5 to about 30 milliseconds after said sensor means provides said signal to said actuatable means.

* * * * *